3,594,236
METHOD FOR PREPARING AN AIR BREATHING ELECTRODE
David P. Boden, Yardley, Pa., and Jack C. Sklarchuk, Trenton, N.J., assignors to ESB Incorporated
No Drawing. Filed Nov. 22, 1967, Ser. No. 684,935
Int. Cl. H01m 27/04
U.S. Cl. 136—120                                    10 Claims

ABSTRACT OF THE DISCLOSURE

A method for preparing an air breathing electrode which comprises applying a catalyst composition to a metallic grid member, applying a fluorocarbon polymer sheet material containing a poreforming agent onto one side of the catalyst composition and thereafter removing the pore-former from the fluorocarbon polymer sheet material to render it microporous. The fluorocarbon polymer sheet material is applied to the catalyst composition by hot pressing to firmly attach it thereto. The metallic salt pore-former is removed from the fluorocarbon polymer sheet material after it is applied to the catalyst composition, and the pore-former may be removed by contacting the electrode with a leaching solvent. An alternative procedure comprises applying a layer of a catalyst composition onto a fluorocarbon polymer sheet material containing a pore former, placing a metallic grid onto the catalyst layer, hot pressing the grid/catalyst/fluorocarbon polymer to form a unitary structure, and then removing the pore-former.

BACKGROUND OF THE INVENTION

The present state of fuel cell development requires the use of very expensive catalyst materials for both oxygen and fuel electrodes and also requires complicated and expensive auxiliary equipment for efficient operation. In order to avoid these disadvantages of fuel cell power systems, other power sources such as air depolarized cells have been investigated. An air depolarized cell having an air or oxygen electrode capable of breathing air or oxygen from the atmosphere would be a substantial improvement in this type of power system, for it would eliminate the need for oxygen tanks and other auxiliary equipment.

During the development of an air breathing electrode, great difficulty was encountered in preparing an electrode capable of breathing air and also capable of containing electrolyte within the air depolarized cell. A thin, hydrophobic fluorocarbon polymer sheet material having uniform microporosity has been developed, and after applying this fluorocarbon polymer sheet material to one side of the air electrode, it is capable of breathing air and also retaining electrolyte within the air depolarized cell. One of the principal problems encountered during this development, was how to firmly attach the microporous fluorocarbon polymer sheet material to the electrode catalyst composition without destroying its uniform microporosity. This problem has been overcome by preparing the air breathing electrode in accordance with the method of this invention.

SUMMARY OF THE INVENTION

This invention comprises applying a thin, microporous fluorocarbon polymer sheet material to one surface of an air electrode in such a manner as to firmly attach it thereto without destroying or otherwise adversely affecting the uniform microporosity of the fluorocarbon polymer sheet material. This is accomplished by leaving the pore-forming agent in the fluorocarbon polymer sheet material during its application to the catalyst composition and thereafter, removing the pore-forming agent with a leaching solvent.

In order to firmly attach the fluorocarbon polymer sheet material to the electrode, it is preferred to hot press the fluorocarbon polymer sheet material onto the catalyst composition. This method is particularly valuable because it provides an air electrode having uniformly microporous fluorocarbon polymer sheet material firmly applied to one side of the electrode.

DETAILED DESCRIPTION

This invention relates to the method for preparing an air breathing electrode which requires applying a thin, microporous fluorocarbon polymer sheet material to an electrode catalyst composition in such a manner that the uniform microporosity is preserved. In the preparation of the air electrode, the catalyst composition is generally prepared first. The catalyst composition generally comprises an electrically conductive, particulate carrier material, which functions as a carrier for an electrochemically active catalyst. Carbon is the preferred carrier material because of its low cost, but other carrier materials such as finely divided metal powders may be used. The electrochemically active catalyst which is applied to the carrier material may be selected from the well-known fuel cell catalyst materials such as silver, gold and metals of the platinum group (platinum, palladium, rhodium, ruthenium, osmium and iridium). It should be noted that particulate carbon material having this type of catalyst deposited thereon is commercially available. It is also possible to use finely divided catalyst materials without a carrier, but since the catalysts are generally very expensive, it is preferred to use a lower cost carrier material such as carbon. Furthermore, finely divided carbon can function as the catalyst material without the expensive catalysts mentioned above, but these catalysts substantially improve the efficiency of the electrochemical reaction occurring at the air electrode, and therefore, it is preferred that one or more of these catalysts be present in the catalyst composition.

The catalyst material may be present in amounts ranging from about 0.01 to about 10% by weight of the carrier material, with about 5% platinum and 1% silver each having been found satisfactory. It is generally preferred to use silver as the catalyst for it provides substantially the same performance as platinum at a considerable cost saving, and the silver catalyst usually has a longer life. In addition, the catalyst composition may also contain a hydrophobic material which functions as a wet-proofing agent. The purpose of the wet-proofing agent is to prevent electrolyte from completely covering the surface of the air electrode catalyst when it is immersed in the aqueous electrolyte. Examples of wet-proofing agents which may be used are fluorocarbon polymers, silicone resins, or paraffin wax. The wet-proofing agent generally comprises from about 5 to about 50% by weight of the total catalyst composition, with about 20% being preferred.

The thin, microporous fluorocarbon polymer sheet material which is applied to one surface of the air electrode is an important element of this invention. This fluorocarbon polymer sheet material must have uniform microporosity enabling the electrode to breathe air, and the micropores must be of such a small size that the hydrophobic property of the fluorocarbon polymer will prevent electrolyte leakage. It has been found that the pore-forming particles, e.g. a metallic salt, should be sufficiently small to pass through a 200-mesh screen, equivalent to a particle size of about 73 microns or less, and particles passing through a 325-mesh screen, equivalent to a particle size of about 40 microns or less, have been found to yield satisfactory microporous polytetrafluoroethylene sheet material. In addition, the fluorocarbon polymer sheet material must be firmly attached to the catalyst composition in order to permit a prolonged operation of the air depolarized cell in which the air electrode is employed. The fluorocarbon polymer sheet material may be prepared from various fluorocarbon polymers such as polytetrafluoroethylene, polytrifluoroethylene, polyvinyl fluoride, polytrifluorochloroethylene and copolymers thereof, with polytetrafluoroethylene being particularly preferred. In general, fluorocarbon polymer sheet material having a thickness ranging from about 5 to about 30 mils has been found satisfactory.

In preparing an air electrode, the catalyst composition is generally prepared first. This may be accomplished by forming a slurry of the catalyst-containing carrier particles in water. The slurry is stirred rapidly and a diluted solution of the wet-proofing agent, preferably polytetrafluoroethylene, is slowly added to the slurry. After a homogeneous composition is formed, it is washed thoroughly in water and/or an organic solvent such as acetone and then it is allowed to dry. The electrode is formed by pressing the catalyst composition onto a clean porous metallic grid member using pressure ranging from about 5,000 to about 30,000 p.s.i.

It should be noted that the metallic grid member should not corrode in the electrolyte in which the electrode will be immersed. For alkaline or neutral electrolytes, it is generally preferred to use nickel screen as the grid member. In acid electrolyte, tantalum or columbium are the preferred grid member metals.

Another requirement of this invention is that the fluorocarbon polymer sheet material be capable of being rendered microporous after it is applied to one surface of the catalyst composition, or the catalyst composition is applied to its surface. The fluorocarbon polymer sheet material is prepared by forming a mixture of a fluorocarbon polymer (polytetrafluoroethylene is preferred), metallic salt particles which function as a pore-forming agent (sodium carbonate or calcium formate are preferred), and a paraffin wax which functions as a binder and a lubricant. This mixture is mixed in a high speed blender and thereafter is formed into sheet material using conventional means such as a rubber mill. After the mixture is formed into a sheet, the paraffin wax is removed by treating the sheet with an organic solvent such as by immersing it in an acetone bath. Then the sheets are sintered in a sintering furnace at the appropriate temperature for sintering the fluorocarbon polymer. After the sheet is sintered and while it still contains the metallic salt pore-forming particles, it is ready for application to the catalyst composition of the air electrode.

The critical part of the preparation of the air electrode involves the application of the fluorocarbon polymer sheet material onto the catalyst composition. The catalyst composition may be pressed onto the metallic grid member prior to applying the fluorocarbon polymer sheet. Alternatively, the catalyst composition and the fluorocarbon polymer sheet can be pressed onto the grid in one step by applying a layer of catalyst onto the fluorocarbon polymer sheet, placing a grid on the catalyst layer, and then hot pressing these components to form a unitary structure. In carrying out this operation, several problems were encountered. If the fluorocarbon polymer sheet material has already been rendered microporous, only very slight pressure can be used to apply it to the air electrode and this causes poor adherence to the electrode. In addition, even slight pressure causes destruction of some of the micropores. Another method which was tried involved spraying a fluorocarbon polymer emulsion onto one surface of the air electrode, but this also resulted in poor adherence and also non-uniform porosity. A third method which proved to be more satisfactory involved pressing the microporous fluorocarbon polymer sheet material on the air electrode and placing a plastic mesh material (VEXAR) over the fluorocarbon polymer sheet. Pressure was applied to the plastic mesh which adhered the fluorocarbon polymer under the strands of the mesh to the electrode, but which prevented the microporous fluorocarbon polymer sheet under the openings of the plastic mesh from becoming compressed and it retained its porosity. Whereas this method was an improvement, it had several disadvantages. Some of the microporous fluorocarbon sheet material has its porosity destroyed and therefore blocks off a portion of the air electrode. Another problem which was encountered involved the plastic mesh material penetrating the fluorocarbon polymer sheet material which caused the air electrode to leak electrolyte. Furthermore, this method did not provide sufficient adherence of the fluorocarbon polymer sheet material to the catalyst composition as required in air-metal cells operated through many discharge-charge cycles.

In accordance with the method of this invention, these problems have been overcome by applying the fluorocarbon polymer sheet material to the catalyst composition while it still retains the pore forming agent. In accordance with this method, the fluorocarbon polymer sheet material containing the pore former is hot pressed onto the catalyst composition at a temperature ranging from about 200° F. to about 400° F. and at a pressure ranging from about 5,000 p.s.i. to about 30,000 p.s.i. This heat and pressure is maintained for about 2 minutes. Hot pressing temperatures below 200° F. result in poor adhesion of the polymer sheet to the catalyst composition. This hot pressing operation firmly adheres the fluorocarbon polymer sheet material to the catalyst composition, and thereafter, the electrode containing the fluorocarbon polymer sheet material is immersed in water or other suitable solvent to leach out the pore former from the fluorocarbon polymer. Depending on the solubility of the pore former and the thickness of the fluorocarbon polymer sheet material, removal of the pore former may require immersion in the leaching solvent for about ½ to about 24 hours. It is preferred to use fresh leaching solvent periodically to ensure substantially complete removal of the pore former.

Air electrodes prepared by this method have given excellent performance and have been substantially leakproof. These electrodes are particularly useful in air depolarized cells where the side of the air electrode coated with the microporous fluorocarbon polymer can serve as the side wall of the cell. It is particularly preferred to use two of these air breathing electrodes per cell in which case each air electrode serves as the side wall of the cell. In this manner the atmospheric air has access to the air electrode through the microporous fluorocarbon polymer sheet material which is also capable of retaining the aqueous electrolyte within the cell. Whereas these air breathing electrodes are particularly useful in air depolarized cells, they may also be used in other applications such as fuel cells.

The following examples illustrate the preparation of an air breathing electrode in accordance with this invention.

EXAMPLE I

Calcium formate ($Ca(CHO_2)_2$) was dried at 248° F. and sieved through a —325 mesh screen. A 5/1 mix was prepared by mixing 250 g. of the $Ca(CHO_2)_2$ powder with 83.3 g. of a polytetrafluoroethylene emulsion (Teflon 30) containing 50 g. of polytetrafluoroethylene polymer. The emulsion was diluted with 50 cc. water, stirred rapidly, and then the $Ca(CHO_2)_2$ powder was added slowly. After thoroughly mixing this composition for 10 minutes, it was dried at 257° F. to complete dryness and then reduced to microparticles in a high speed blender. 15 g. of paraffin wax was thoroughly mixed into this composition prior to forming it into sheet material.

A rubber mill was used to form sheets from the blended mix. The back roll of the mill was heated to 140° F. and the front roll to 160° F. The spacing of the rolls was adjusted to yield a sheet 20 mils thick. The powdered mix was poured onto the rubber mill, rolled once, stripped off of the mill roll, folded over and rolled again. This rolling-stripping-rolling procedure was repeated to ensure correct thickness and uniformity, after which the material was stripped from the rolls and retained as sheet material. The sheets were allowed to cool and became stiff but durable and easily handled.

The rolled sheets were then placed in a Soxhlet Extractor containing warm acetone (just below boiling point) to remove the paraffin wax. This extraction process required about ½ hour. The excess acetone carried by the sheet material was blotted off, and the sheet was placed in a cold sintering furnace. The furnace was heated slowly to 650° F. and the polytetrafluoroethylene was sintered at 650° F. for about ½ hour, and thereafter, it was permitted to cool to room temperature.

A catalyst composition was prepared by forming an aqueous slurry of 5% platinum catalyst deposited on a carbon carrier, which is commercially available (Englehard). This slurry was stirred rapidly and a diluted solution of a polytetrafluoroethylene emulsion (Teflon 30) was slowly added to the slurry in an amount to provide 20% by weight of polytetrafluoroethylene per weight of the total dry composition. After mixing the polytetrafluoroethylene into the catalyst composition to form a homogeneous mixture, the composition was washed thoroughly in water, then in acetone and again in water and dried. 3 g. of this wet-proofed catalyst composition was pressed into a clean 75 mesh nickel screen at 14,000 p.s.i. and at room temperature, forming an air electrode having an area on each side of 2.5 inches by 2.5 inches.

Onto one side of the air electrode, a piece of the sintered polytetrafluoroethylene sheet material, still containing the calcium formate pore-former, was pressed at 14,000 p.s.i. and 400° F. for 2 minutes. After hot pressing the polytetrafluoroethylene sheet onto the air electrode, the electrode containing the sheet was immersed in warm water (192° F.) to remove the calcium formate pore-former. To ensure complete removal of the pore-former, the electrode was allowed to remain in the warm water for about 16 hours (overnight), and thereafter it was removed from the water and permitted to dry.

This electrode was tested as a half-cell in 27% potassium hydroxide electrolyte and yielded the following voltages under various loads:

VOLTS VS. $H_2$

Open circuit _____ 0.980
Ma./cm.$^2$:
  20 _____ 0.850
  50 _____ 0.770
  100 _____ 0.645
  150 _____ 0.455

EXAMPLE II

Air electrodes were prepared in accordance with the method set forth in Example I with the exception that the temperature at which the polyterafluoroethylene was hot pressed onto the catalyst composition was varied. Temperatures of 200° F., 300° F., 400° F. and 500° F. were selected and the performance of these air electrodes in half-cells using 27% potassium hydroxide electrolyte was determined. The results were as follows:

| Pressing tempera-ture, ° F. | Volts vs. $H_2$ | | | | |
|---|---|---|---|---|---|
| | Open circuit | Ma./cm.$^2$ | | | |
| | | 20 | 50 | 100 | 150 |
| 200 | 0.985 | 0.850 | 0.730 | 0.255 | |
| 300 | {1.005 | 0.835 | 0.760 | 0.665 | 0.535 |
| | {0.990 | 0.850 | 0.770 | 0.645 | 0.570 |
| 400 | {1.000 | 0.870 | 0.805 | 0.710 | 0.600 |
| | {1.005 | 0.840 | 0.755 | 0.640 | 0.570 |
| 500 | | | | | |

The electrodes hot pressed at 500° F. could not be tested for during the hot pressing step the catalyst composition ignited causing the polytetrafluoroethylene to flow and warp, and the burned catalyst composition fell away from the nickel screen and the polytetrafluoroethylene sheet. It was concluded that hot pressing temperatures greater than 200° F. and less than 500° F. are satisfactory for the method of this invention when using polytetrafluoroethylene. Of course, it may be possible to vary the hot pressing temperature if other fluorocarbon polymer materials or catalyst compositions are used.

Having completely described this invention, what is claimed is:

1. A method for preparing an air breathing electrode which comprises applying a catalyst composition to a metallic grid member to form an electrode, hot pressing a fluorocarbon polymer sheet containing a pore-forming agent onto one side of said catalyst composition, and then contacting the electrode with a leaching solvent for the pore-former to remove it from the fluorocarbon polymer sheet and thereby render it microporous.

2. A method in accordance with claim 1 in which the pore-forming agent has a particle size less than about 73 microns.

3. A method in accordance with claim 2 in which the fluorocarbon polymer is polytetrafluoroethylene and the hot pressing operation is performed at a temperature greater than about 200° F. and less than about 500° F.

4. A method in accordance with claim 2 in which the catalyst composition comprises an electrochemically active catalyst deposited on an electrically conductive, particulate carrier material and a hydrophobic wet-proofing agent.

5. A method in accordance with claim 4 in which the fluorocarbon polymer is polytetrafluoroethylene and the pore-forming agent has a particle size less than about 40 microns.

6. A method for preparing an air breathing electrode which comprises applying a thin layer of a catalyst composition onto a fluorocarbon polymer sheet which contains a pore-forming agent, placing a metallic grid on the catalyst composition layer, hot pressing the grid/catalyst composition/fluorocarbon polymer sheet to form a unitary electrode structure, and then contacting the electrode structure with a leaching solvent for the pore-former to remove it from the fluorocarbon polymer sheet and thereby render it microporous.

7. A method in accordance with claim 6 in which the hot pressing operation is performed at a temperature between about 200° F. and about 500° F.

8. A method in accordance with claim 6 in which the pore-forming agent has a particle size less than about 73 microns.

9. A method in accordance with claim 6 in which the catalyst composition comprises an electrochemically active catalyst deposited on an electrically conductive, particulate carrier material.

10. A method in accordance with claim 7 in which the fluorocarbon polymer is polytetrafluoroethylene.

References Cited

UNITED STATES PATENTS

| 3,281,511 | 10/1966 | Goldsmith | 264—127 |
| 3,385,736 | 5/1968 | Deibert | 136—120 |
| 3,385,780 | 5/1968 | I-Ming Feng | 136—120X |
| 3,432,355 | 3/1969 | Niedrach et al. | 136—86 |

WINSTON A. DOUGLAS, Primary Examiner

M. J. ANDREWS, Assistant Examiner